(12) United States Patent
Kay

(10) Patent No.: US 7,334,955 B2
(45) Date of Patent: *Feb. 26, 2008

(54) TURNBUCKLE HEAD ASSEMBLY

(76) Inventor: Jon D. Kay, 14442 SE. 318th, Auburn, WA (US) 98092

( * ) Notice: Subject to any disclaimer, the term of this patent is extended or adjusted under 35 U.S.C. 154(b) by 166 days.

This patent is subject to a terminal disclaimer.

(21) Appl. No.: 11/121,754

(22) Filed: May 3, 2005

(65) Prior Publication Data

US 2005/0263301 A1 Dec. 1, 2005

Related U.S. Application Data

(63) Continuation-in-part of application No. 11/015,177, filed on Dec. 17, 2004.

(60) Provisional application No. 60/549,323, filed on Mar. 1, 2004.

(51) Int. Cl.
*B66F 3/00* (2006.01)
*F16B 7/06* (2006.01)
*F16G 11/12* (2006.01)

(52) U.S. Cl. .......................... 403/46; 403/53; 254/243; 254/246; 254/256

(58) Field of Classification Search .................. 403/43, 403/45, 46, 53; 254/243, 246, 256, 261
See application file for complete search history.

(56) References Cited

U.S. PATENT DOCUMENTS

| 304,815 A | 9/1884 | Flynn |
| 1,208,182 A | 12/1916 | Martin |
| 1,247,760 A | 11/1917 | Wengraf |
| 1,374,963 A | 4/1921 | Stevenson |
| 1,393,614 A | 10/1921 | Ferragamo |
| 1,413,328 A | 4/1922 | Ferragamo |
| 2,359,492 A | 10/1944 | Rockwood |
| 2,465,621 A | 3/1949 | Wheeler |
| 2,705,125 A | 3/1955 | Weise |
| 2,793,892 A | 4/1957 | Hutterer |
| 3,051,519 A | 8/1962 | Sudeikis |
| 3,377,036 A | 4/1968 | McNatt et al. |
| 3,402,961 A | 9/1968 | Larson |
| 3,610,606 A | 10/1971 | Andrews |
| 3,623,690 A | 11/1971 | Bargman, Jr. |
| 3,751,083 A | 8/1973 | Jacobson et al. |
| 3,782,774 A | 1/1974 | Sturek |
| 3,837,701 A | 9/1974 | Curtis et al. |
| 3,938,844 A | 2/1976 | Johnson, Jr. |
| 4,025,207 A | 5/1977 | Johnson, Jr. |
| 4,090,691 A | 5/1978 | Bingaman |
| 4,335,489 A | 6/1982 | Muller et al. |
| 4,401,333 A | 8/1983 | Merry |
| 4,458,940 A | 7/1984 | Hildebrand |
| 4,573,842 A | 3/1986 | Mantela et al. |
| 4,693,097 A * | 9/1987 | Rivera ........................... 70/18 |

(Continued)

*Primary Examiner*—Robert J. Sandy
*Assistant Examiner*—Joshua T. Kennedy
(74) *Attorney, Agent, or Firm*—R. Reams Goodloe, Jr.

(57) ABSTRACT

A turnbuckle head assembly. The device includes a pivot housing to which is secured a pivotable handle. An upper attachment feature is pivotably affixed to the pivotable handle. At the bottom portion of the pivot housing, an attachment feature such as a threaded nut is provided for securely accepting a tensionable member such as a threaded rod. Alignable apertures are provided in frame members of the pivoting housing and in the pivotable handle, for locking the device via pin or lock.

17 Claims, 7 Drawing Sheets

U.S. PATENT DOCUMENTS

| | | |
|---|---|---|
| 4,778,194 A | 10/1988 | Koch et al. |
| 5,680,676 A * | 10/1997 | Spirk et al. ............ 16/430 |
| 5,702,196 A | 12/1997 | Petercsak |
| 5,704,668 A | 1/1998 | Ferrato |
| 5,765,957 A | 6/1998 | Connell |
| 6,048,146 A | 4/2000 | Wiedmeyer |
| 6,050,737 A | 4/2000 | Russell |
| 6,056,069 A | 5/2000 | Hagen et al. |
| 6,065,914 A | 5/2000 | Fotou |
| 2005/0191118 A1 | 9/2005 | Kay |
| 2005/0254886 A1 | 11/2005 | Kay |

* cited by examiner

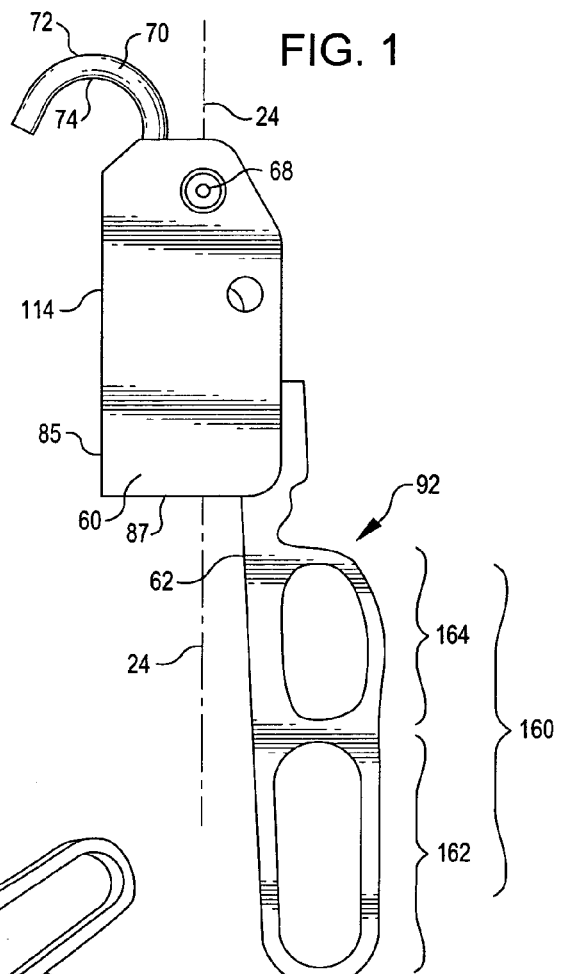
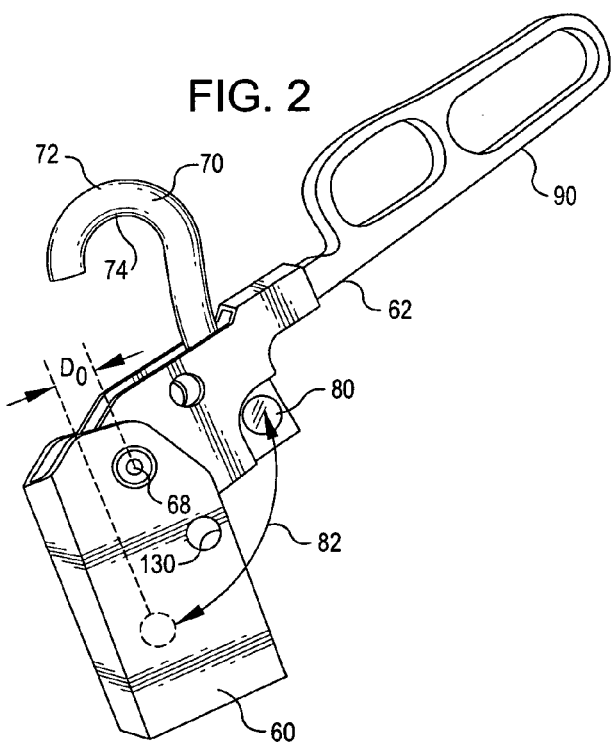

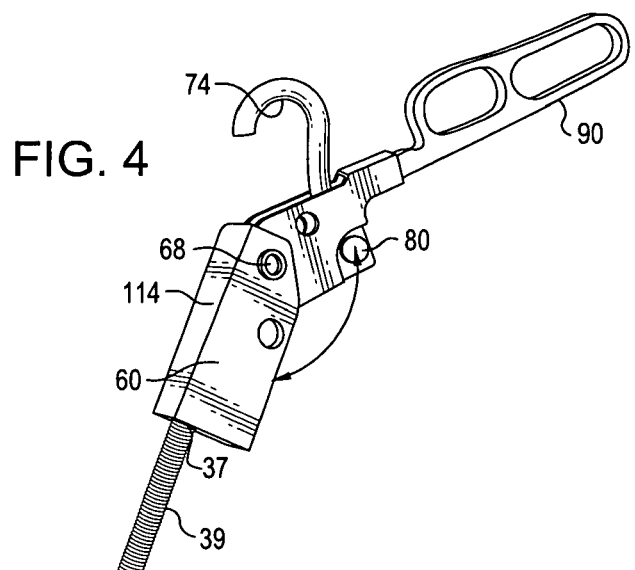
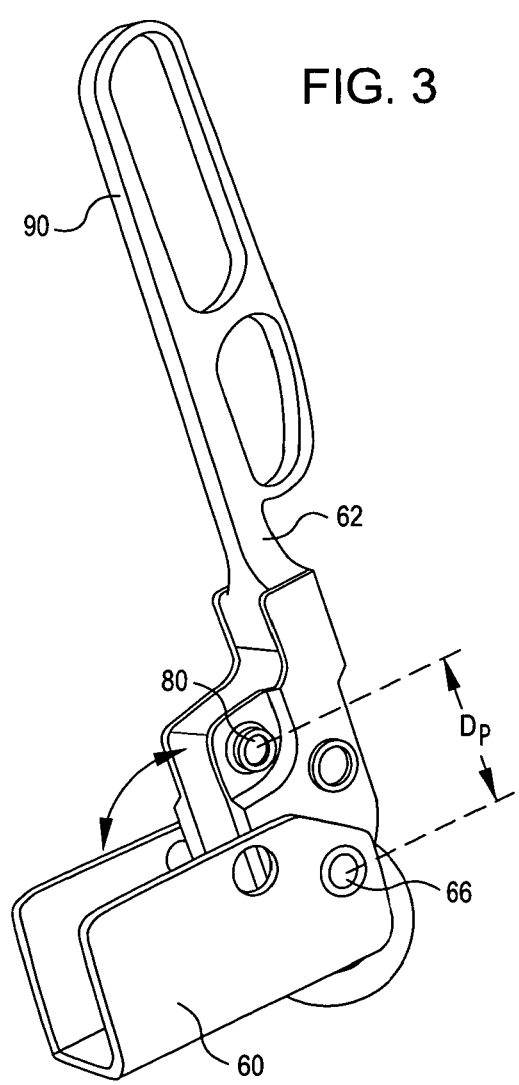

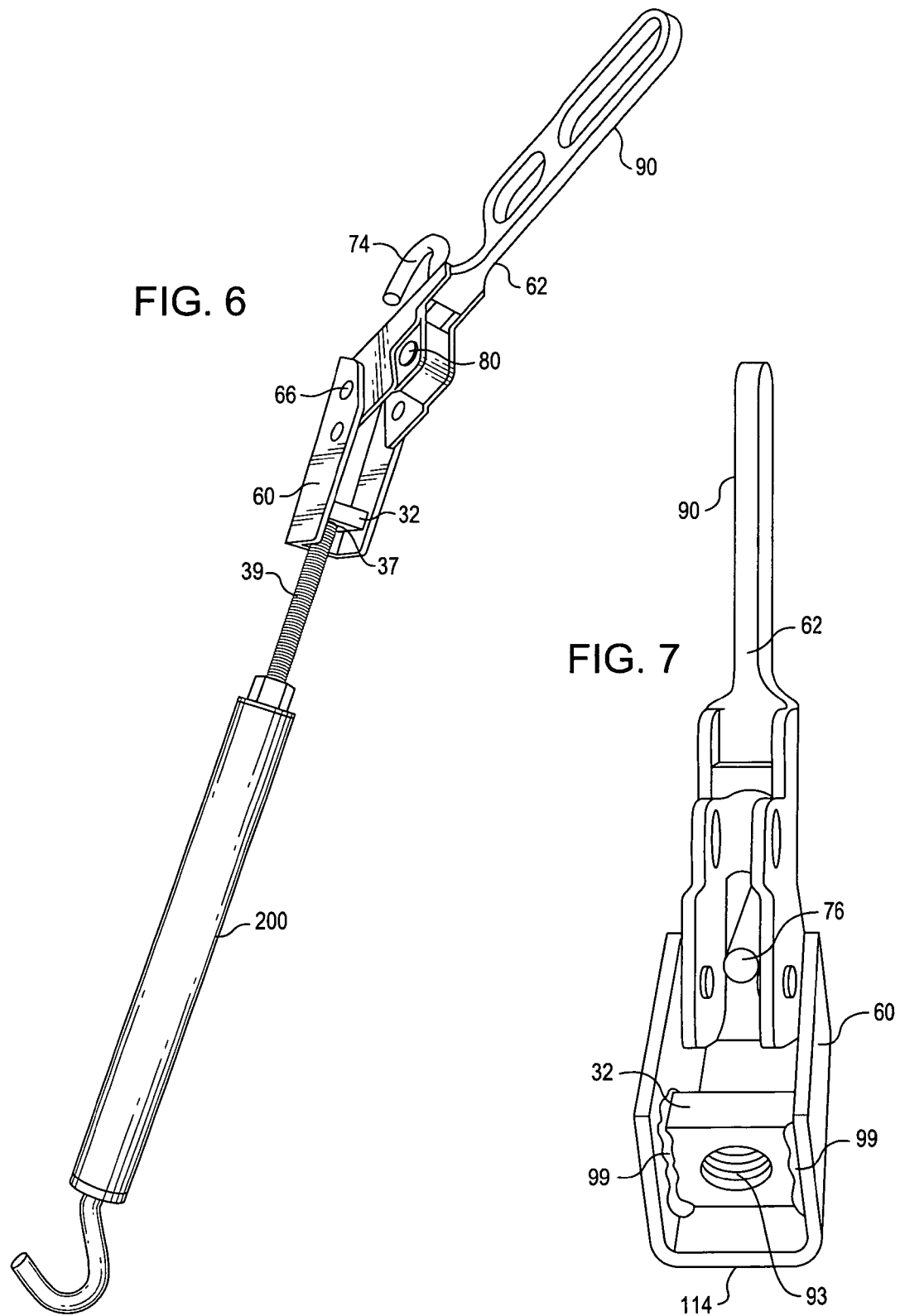

TURNBUCKLE HEAD ASSEMBLY

RELATED PATENT APPLICATIONS

This invention is related to and claims priority from U.S. Provisional Patent Application Ser. No. 60/549,323, filed Mar. 1, 2004, entitled SPRING LOADED TURNBUCKLE WITH QUICK DISCONNECT, and is a continuation in part from U.S. patent application Ser. No. 11/015,177, filed Dec. 17, 2004, entitled SPRING LOADED TURNBUCKLE WITH QUICK DISCONNECT, the disclosures of each of which are incorporated herein in their entirety by this reference, including the specification, drawings and claims of each application.

COPYRIGHT NOTICE

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to the field of turnbuckles, and more particularly, to quickly releasable turnbuckle heads.

BACKGROUND

Turnbuckles have been used for many years, and various versions have long provided their unique attributes for various tasks where it was desired to tighten the connection between two anchor points. In various turnbuckle designs, the use of a spring has been adapted to include a way to assure tensioning when for some reason the distance between the two anchor points might change or periodically vary to some limited extent. One situation where adjustable tensioning devices are desirable are those applications where loads are situated on transport vehicles, such as trucks. Many different types of turnbuckles for tensioning connections between loads and transport vehicles, or less commonly, between stationary objects and secure anchor points, are in use today.

Especially in the case of securing loads to transport vehicles, it would be a distinct and important improvement to provide a turnbuckle head assembly useful in a spring loaded tensioning device that can be quickly and easily secured between selected anchor points. Moreover, it would be desirable to provide a turnbuckle head assembly which can be quickly released from between anchor points, thus allowing the turnbuckle tensioning device to be easily removed. Thus, the important advantages of a turnbuckle head assembly providing such desirable features in a workable tensioning apparatus can be readily appreciated.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein:

FIG. 1 is a side view of a turnbuckle head assembly with a pivotable quick release handle, configured for securing a load against a first or upper hook.

FIG. 2 is a perspective view of a turnbuckle head assembly with a pivotable quick release handle similar to the view just illustrated in FIG. 1 above, but now showing in the device in an open, unsecured configuration, ready for attachment to a load using the upper attachment device or hook.

FIG. 3 is a perspective view of the lower portion of a turnbuckle head assembly, now additionally showing apertures for use with a locking pin, although the locking pin is not shown.

FIG. 4 is a perspective view of a turnbuckle head assembly in use attached to a threaded turnbuckle shaft, ready for attachment to a load.

FIG. 6 is a back perspective view of a turnbuckle head assembly in use attached to a threaded turnbuckle shaft, ready for attachment to a load.

FIG. 7 shows a bottom perspective view of a turnbuckle head assembly, with a nut welded in place for attachment to a threaded turnbuckle shaft.

Figure 5:
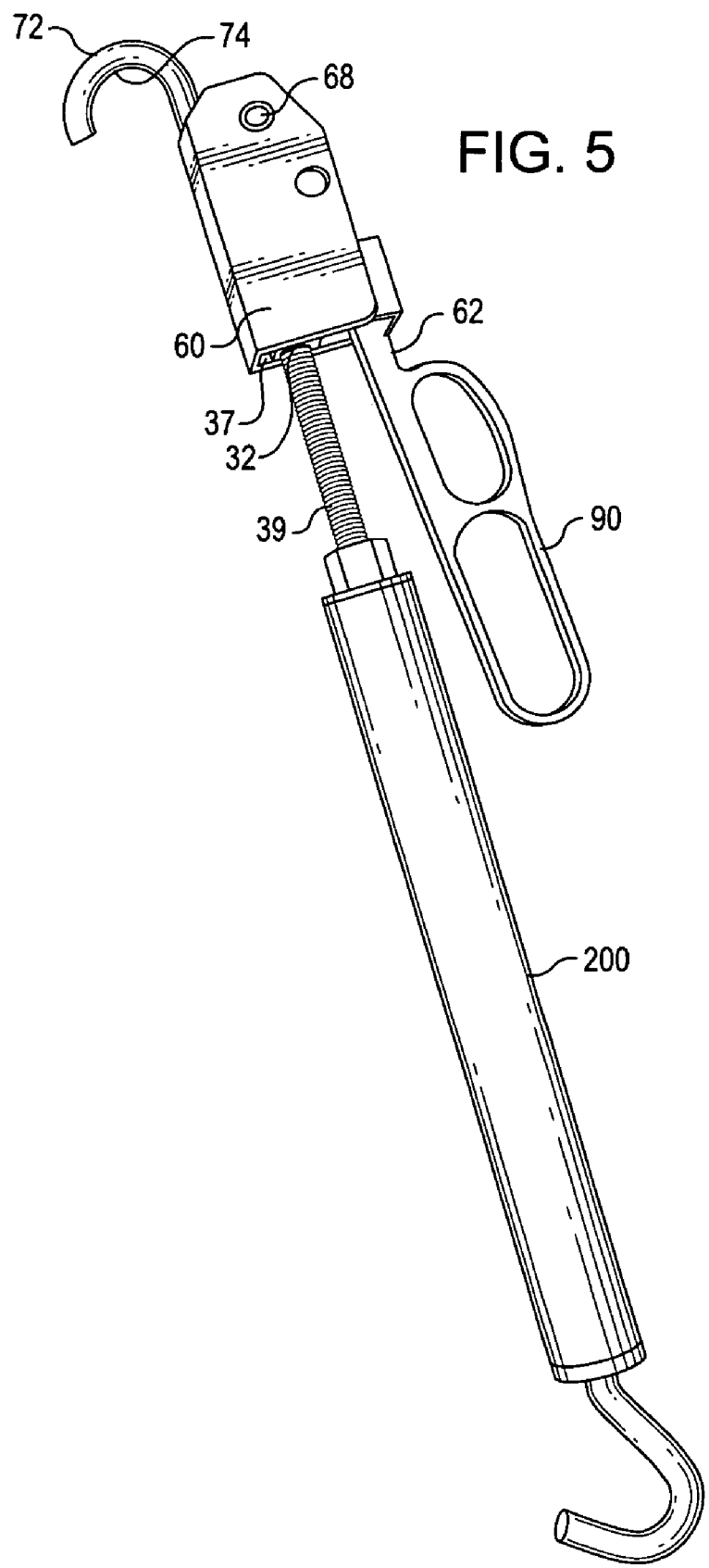
FIG. 5 is a perspective view of a turnbuckle head assembly in use attached to a threaded turnbuckle shaft, ready for attachment to a load.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of a turnbuckle head assembly device, especially as applied for different variations of the functional components illustrated, as well as different embodiments of artistic elements such as a handle design, may be utilized in order to provide a robust turnbuckle head assembly for use in spring loaded turnbuckle devices with quick disconnect capability.

DETAILED DESCRIPTION

Turning now to FIG. 1, a side view of a turnbuckle head assembly 20 is provided. The device includes an elongated pivot housing 60 extending along a longitudinal axis 21. At the bottom portion 26 of pivot housing 60, an attachment feature such as a fastener or threaded receiver 30 may be provided. In one embodiment, the fastener may be a nut 32 that is dimensioned for interference anti-rotation fit between first and second interior walls (further described below) of the pivot housing 60.

Figure 9:
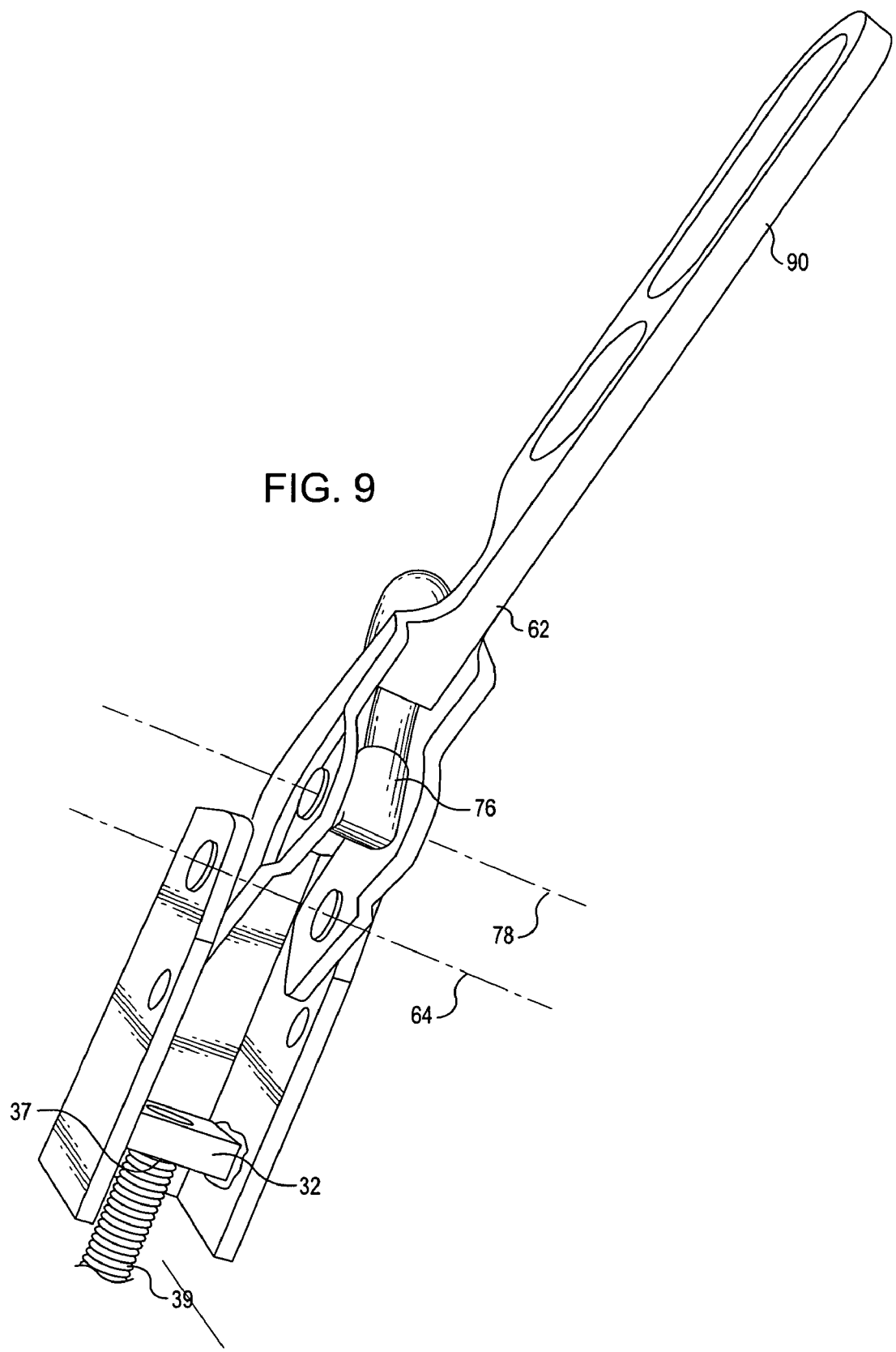
FIG. 9 is a perspective view of the back of a turnbuckle head assembly, showing the turnbuckle head assembly affixed to a threaded turnbuckle shaft.

As illustrated in FIGS. 7 and 9, the nut 32 is caged or secureable against rotation by the interior walls of pivot housing 60, when a complementary end portion 37 of an elongated tensionable member such as rod 39 as noted in FIG. 4.

A pivot housing 60 is provided, as illustrated in the various figures. A pivotable handle 62 is pivotably secured to the pivot housing 60 along a first pivot axis 64 (see FIGS. 8 and 9). First 66 and in one embodiment second 68 pivot pins are disposed along first pivot axis 64 to pivotally connect the pivot handle 62 with the pivot housing 60.

An upper attachment device 70 having an upper end 72 with an attachment feature such as a hook 74 is provided. The upper attachment device 70 has a lower end 76 pivotally affixed to the pivotable handle 62 along a second pivot axis 78, using hook pivot pin 80 (see FIGS. 2 and 4). As can be appreciated by review of FIG. 2, the lower end 76 of the upper attachment device 70 is displaceable arcuately along arc indicated by reference numeral 82 in a direction outward from the first portion 85 of pivot housing 60 and thus increasing the distance between the second pivot axis 78 and the bottom portion 87 of the pivot housing 60, when the pivotable handle 62 is moved toward a first, open position 90 as seen in FIG. 2. The lower end 76 of the upper attachment device 70 is displaceable arcuately 82 in a direction inward toward the bottom portion 87 of the pivot housing 60 and decreasing the distance between the second pivot axis 78 and the bottom portion 87 of the pivot housing 60 when the pivotable handle 62 is moved toward a second, closed position 92 as indicated in FIG. 1. As can be seen by comparison of FIGS. 1 and 2, in one embodiment, an "over centered" configuration is utilized so that the turnbuckle handle 62 will be stable in a closed position 92, since when in the closed position 92, the first pivot axis 64 and the second pivot axis 78 are not centered along a common longitudinal axis along or parallel to the longitudinal axis of the pivot housing 60. Rather, the second pivot axis 78 is offset rearward from the first pivot axis 64 by a preselected offset distance of $D_o$ as indicated in FIG. 2.

At or near the bottom portion 87 of pivot housing 60, an attachment feature may be provided. As indicated in FIGS. 6, 7, and 9, a threaded fastener such as a nut 32 may be utilized as an attachment feature. In one embodiment, a locking type nut can be used. Also, a nut 32 may be secured by weldment 99 as seen in FIG. 7 to pivot housing 60.

Figure 8:
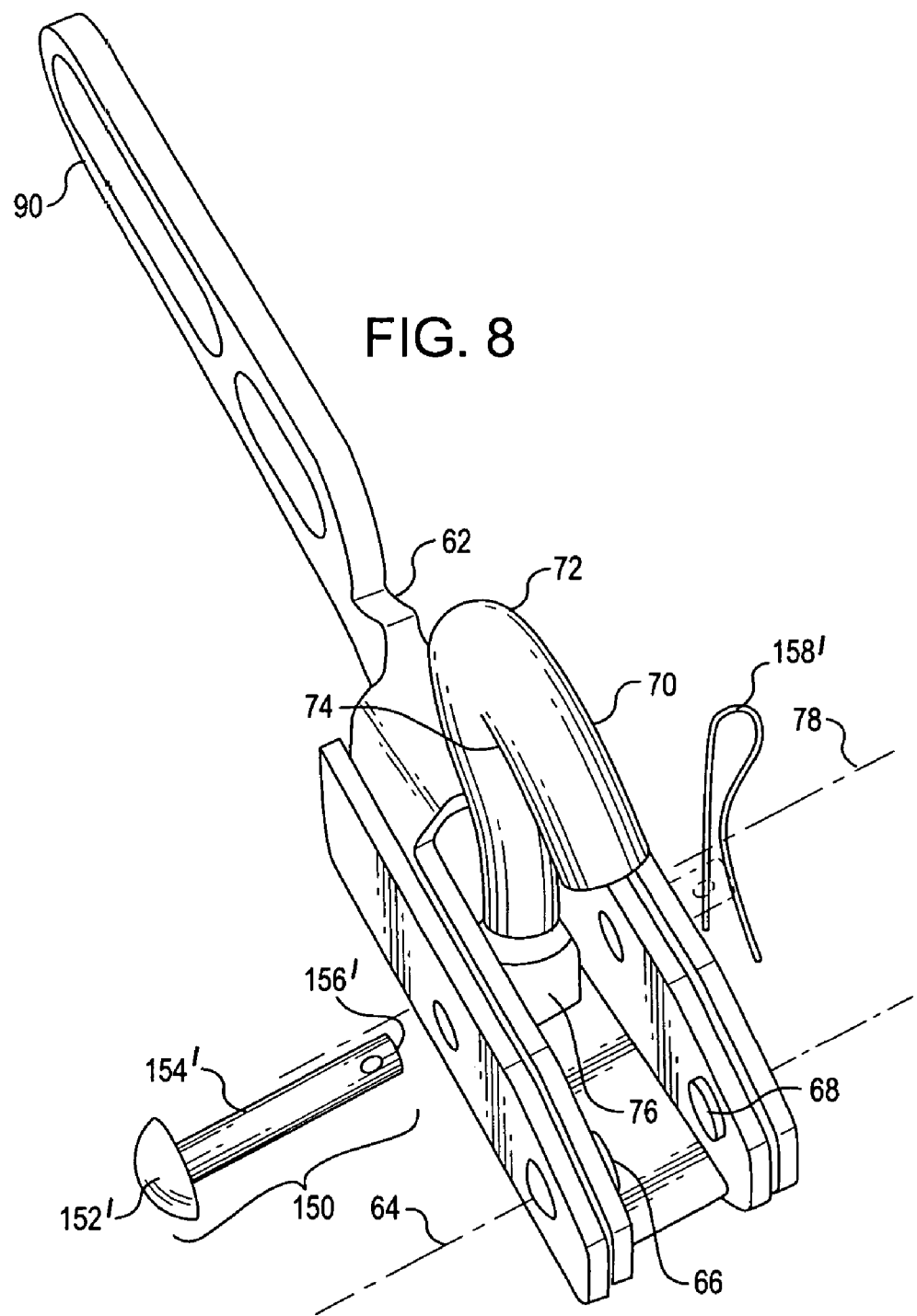
FIG. 8 is a perspective view of the back of a turnbuckle head assembly.
Figure 10:
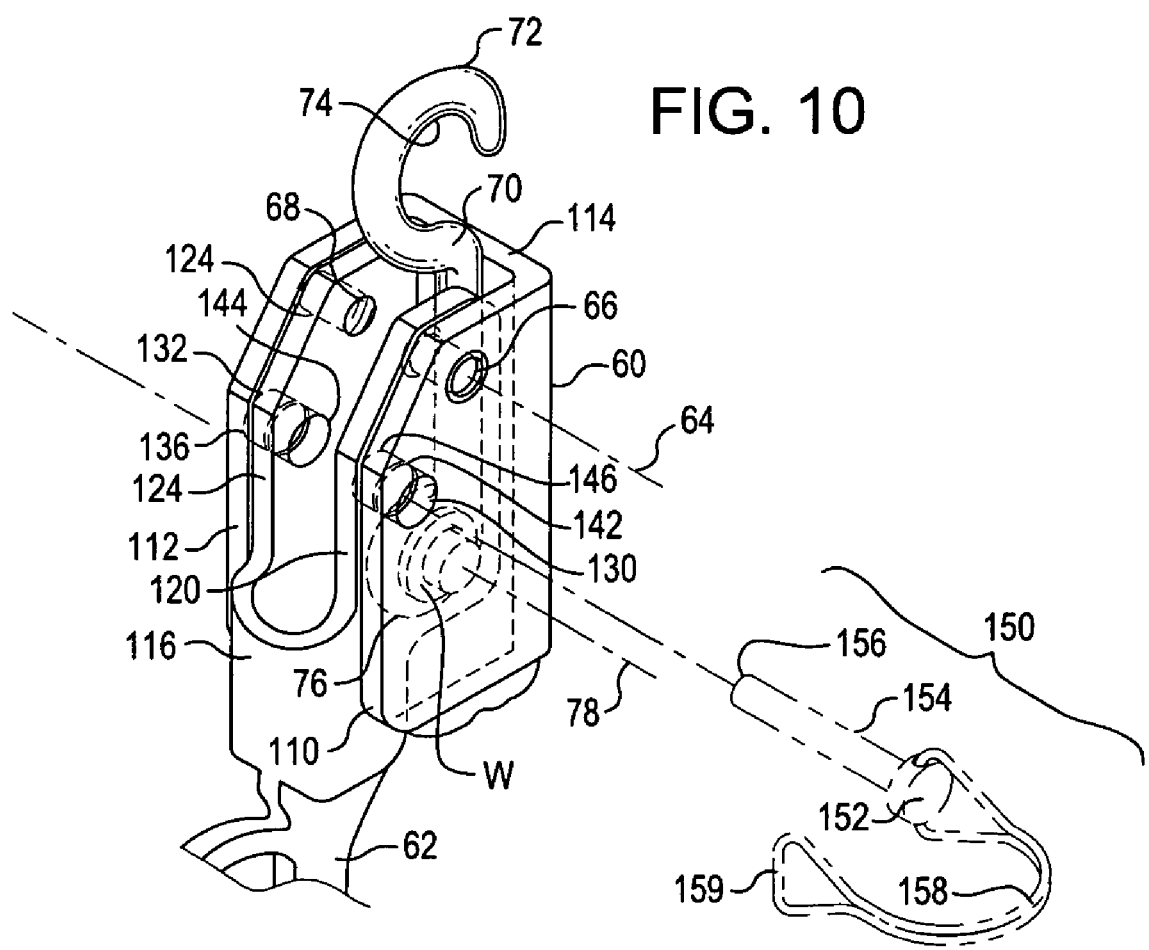
FIG. 10 shows the details of the frame members of the turnbuckle head assembly, and a locking pin.

As described in detail in FIG. 10, in one embodiment it has been found convenient to provide the pivot housing 60 with first 110 and second 112 frame members, and in one embodiment, a back 114 along first portion 85. If desired, first 110, second 112, and back 114 frame members can be provided in a unitary, one-piece configuration. Also, to make a compact and protectable turnbuckle head assembly, the pivotable handle 62 can be provided in an embodiment wherein a wishbone shaped upper end 116 is provided having opposing third 120 and fourth 124 frame members. As illustrated, the first 110 and third 120 frame members are pivotally secured one to the other by a first handle pivot pin 66. The second 112 and fourth 124 frame members are pivotally secured one to the other by a second handle pivot pin 68. As earlier noted, the first 66 and second 68 handle pivot pins are located along a common axis of rotation 64. For an embodiment as depicted in FIG. 8, the common axis of rotation 64 is transverse to the longitudinal axis of the pivot housing 60.

For one embodiment shown, the lower end 76 of upper attachment device 70 is pivotally affixed to pivotable handle 62 at a second pivot 78 axis extending between the third 120 and fourth 124 frame members, by pivot pin 80, and between washers W. The second pivot axis 78 is parallel to the common axis of rotation 64 of first 66 and second 68 handle pivot pins. As shown, the second pivot axis 78 and the common axis of rotation 64 are centered by a spaced apart selected distance $D_P$. For small turnbuckles as might be useful for attachment between pickup trucks and campers, a center to center pivot distance $D_P$ of at least one inch can be utilized. More preferably, the preselected center to center spaced apart distance $D_P$ is about one and one-half inches.

In order to provide security, or use of locks, the first frame 110 and second frame 112 have first 130 and second 132 frame apertures therethrough defined by first frame aperture throughwalls 134 and second frame aperture throughwalls 136, respectively. First 130 and second 134 frame apertures are aligned along a common aperture axis 140 transverse to the longitudinal axis of the elongated member 22.

The third 120 and said fourth 124 frames have third 142 and fourth 144 frame apertures therethrough defined by third frame aperture throughwall 146 and fourth frame aperture throughwall 148, respectively. The first 130, second 134, third 142, and fourth 144 frame apertures are aligned along a common axis 140 transverse to the longitudinal axis of the elongated member 22.

Turning now to FIGS. 10 and 8, a locking pin 150 or 10', respectively, can be provided to secure turnbuckle head assembly 20 in a closed position. The locking pin 150 or 150' is sized and shaped for releasable mating engagement through the said first 130, second 134, third 142, and fourth 144 frame apertures and thus with the first 110, second 112, third 120, and fourth 124 frames. In this manner, when the said pivotable handle 62 is placed in the second, closed position 92, the first 130, second 134, third 142, and fourth 144 frame apertures are in alignment along axis 140. The locking pin 150 or 150' has a head 152 or 152', respectively, a shaft portion 154 or 154' respectively, and a distal end 156 or 156', respectively. A spring catch 158 may be provided pivotally affixed to the head portion 152. The catch 158 includes a bootstrap end portion 159 which is releasably spring latchable over the distal end 156 of the locking pin 150. In one embodiment, the shaft portion 154 or 154' of the locking pin 150 is cylindrical in shape. In such a case, the first 130, second 134, third 142, and fourth 144 apertures are provided in complementary size and shape for close fitting mating engagement.

The pivotable handle 62 may be provided with an upper end having a wishbone shape 116 with outwardly extending opposing frame members 120 and 124. The upper attachment device 70 is thus pivotally secured between frame members 120 and 124 via pivot pin 80. Pivotable handle 62 may include a functional as well as decorative grip end portion 160. The size and shape of the grip end portion is configured for the fitting of at least some of a user's fingers therethrough. In one embodiment, for example as seen in FIG. 1, the grip end portion 160 may include a lever portion 162 and a trigger portion 164. Then, the lever portion 162 is sized and shaped for fitting of a plurality of a user's fingers therethrough. More fundamentally, the functional shape of the grip end portion 160 may be provided in a rifle handle and trigger lock configuration. Such a configuration provides for ease of use; however, other pivotable handle 62 configurations may be provided.

An elongated tensionable member 39 extending from a conventional turnbuckle spring chamber 200 may be provided for attachment to the turnbuckle head assembly 20, as seen in FIG. 4. In such cases, the end portion 37 of the threaded shaft 39 may be provided in a size and shape for secure mating engagement with attachment feature such as nut 32.

It is to be appreciated that the various aspects and embodiments of a turnbuckle head assembly for use with a spring loaded quick disconnect turnbuckle device having a tensionable shaft as described herein are an important improvement in the state of the art. The turnbuckle head assemble device described herein is simple, robust, reliable, and susceptible to use in a variety of applications. Although only a few exemplary embodiments have been described in detail, various details are sufficiently set forth in the drawings and in the specification provided herein to enable one of ordinary skill in the art to make and use the invention(s), which need not be further described by additional writing in this detailed description.

Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings.

The invention claimed is:

1. An adjustable turnbuckle head assembly, comprising:
   a pivot housing, said pivot housing having a first side portion and a bottom portion, said pivot housing further comprising opposing first and second frame members each having interior sidewalls;
   a pivotable handle, said pivotable handle secured to said pivot housing at a first pivot axis;
   an upper attachment device having an upper end with an attachment feature and a lower end pivotally affixed to said pivotable handle at a second pivot axis;
   said lower end of said upper attachment device displaceable arcuately in a direction outward from said first side portion of said pivot housing when said pivotable handle is moved toward a first, open position;
   said lower end of said upper attachment device displaceable arcuately in a direction inward toward said first side portion of said pivot housing when said pivotable handle is moved toward a second, closed position;
   an attachment feature attached to said bottom portion of said pivot housing, said attachment feature adapted to securely receive a complementary end portion of a tensionable member, and wherein said attachment feature comprises a caged nut, said caged nut secured or secureable against rotation when said threaded end receptor of a tensionable member is rotated with respect to said caged nut, said caged nut is dimensioned for interference anti-rotation fit within said interior sidewalls of said first and second frame members of said pivot housing, said caged nut welded to said pivot housing.

2. The device as set forth in claim 1, wherein said caged nut is welded to said interior sidewalls of said pivot housing.

3. The device as set forth in claim 1, wherein said pivot housing comprises opposing first and second frame members oriented along a longitudinal axis, and wherein said pivotable handle comprises an upper end having opposing third and fourth frame members, and wherein said first and said third frame members are pivotally secured one to the other by a first handle pivot pin, and wherein said second and fourth frame members are pivotally secured one to the other by a second handle pivot pin, and wherein said first and second handle pivot pins are located along a common axis of rotation.

4. The device as set forth in claim 3, wherein said common axis of rotation is transverse to said longitudinal axis of said pivot housing.

5. The device as set forth in claim 3, wherein said lower end of said upper attachment device is pivotally affixed to said pivotable handle at a second pivot axis extending between said third and said fourth frame members, and wherein said second pivot axis is parallel to said common axis of rotation of said first and said second handle pivot pins.

6. The device as set forth in claim 5, wherein said second pivot axis and said common axis of rotation are centered by a spaced apart selected distance $D_p$.

7. The device as set forth in claim 1, wherein said preselected distance $D_p$ is at least one inch.

8. The device as set forth in claim 3, wherein said first frame and said second frame have first and second frame apertures therethrough defined by first frame aperture throughwalls and second frame aperture throughwalls, respectively, and wherein said first and said second frame apertures are aligned along a common axis transverse to said longitudinal axis of said elongated member.

9. The device as set forth in claim 8, wherein said third and said forth frames have third and fourth frame apertures therethrough defined by third frame aperture throughwalls and fourth frame aperture throughwalls, respectively, and wherein said first, second, third, and fourth frame apertures are aligned along a common axis transverse to said longitudinal axis of said elongated member.

10. The device as set forth in claim 9, further comprising a locking pin, said locking pin sized and shaped for releasable mating engagement through said first, second, third, and fourth frame apertures and thus with said first, second, third, and fourth frames, when said pivotable handle is placed in said second, closed position so that said first, second, third, and fourth apertures are in alignment.

11. The device as set forth in claim 10, wherein said locking pin further comprises a head portion, a shaft portion, and a distal end, and wherein a spring catch detachably affixed to said head portion, said catch having a bootstrap end portion which is releasably spring latchable over said distal end of said locking pin.

12. The device as set forth in claim 11, wherein said shaft portion of said locking pin is cylindrical in shape, and wherein said first, second, third, and fourth apertures are provided in complementary size and shape for close fitting mating engagement.

13. The device as set forth in claim 3, wherein said pivotable handle comprises an upper end portion having a wishbone shape, said wishbone shape comprising opposing frame members pivotally securing said upper attachment device therebetween.

14. The device as set forth in claim 3, wherein said pivotable handle comprises a grip end portion, said grip end portion size and shaped for fitting of at least some of a user's fingers therethrough.

15. The device as set forth in claim 14, wherein said grip end portion comprises a lever portion and a trigger portion.

16. The device as set forth in claim 15, wherein said lever portion is sized and shaped for fitting of a plurality of a user's fingers therethrough.

17. The device as set forth in claim 16, wherein said grip end portion comprises a rifle handle trigger lock configuration.

* * * * *